US008469678B2

(12) United States Patent
Preston

(10) Patent No.: US 8,469,678 B2
(45) Date of Patent: Jun. 25, 2013

(54) CONSTANT TEMPERATURE CIRCULATOR

(75) Inventor: Philip Preston, Northfield, IL (US)

(73) Assignee: Preston Industries, Inc., Niles, IL (US)

(*) Notice: Subject to any disclaimer, the term of this patent is extended or adjusted under 35 U.S.C. 154(b) by 725 days.

(21) Appl. No.: 12/699,365

(22) Filed: Feb. 3, 2010

(65) Prior Publication Data

US 2011/0186283 A1 Aug. 4, 2011

(51) Int. Cl.
*F04B 39/00* (2006.01)
*F04B 17/00* (2006.01)
*B29C 47/88* (2006.01)

(52) U.S. Cl.
USPC .................. 417/313; 417/423.3; 417/423.14; 417/424.1; 165/120; 165/132

(58) Field of Classification Search
USPC ............ 137/563, 565.01; 417/423.3, 423.14, 417/424.1
See application file for complete search history.

(56) References Cited

U.S. PATENT DOCUMENTS

| | | | | |
|---|---|---|---|---|
| D214,165 | S * | 5/1969 | Sesholtz | D23/316 |
| 3,576,378 | A | 4/1971 | Hilmanowski | |
| D222,260 | S | 10/1971 | Read et al. | |
| 4,418,544 | A | 12/1983 | Heybutzki et al. | |
| D286,320 | S | 10/1986 | Kingston | |
| 4,786,237 | A | 11/1988 | Hans | |
| 5,079,784 | A * | 1/1992 | Rist et al. | 4/541.2 |
| 5,881,698 | A * | 3/1999 | Tuckey et al. | 123/497 |
| 6,604,917 | B2 * | 8/2003 | Casper et al. | 417/423.14 |
| 2008/0260557 | A1 * | 10/2008 | Austin et al. | 417/423.3 |
| 2009/0229258 | A1 | 9/2009 | Zapf et al. | |

FOREIGN PATENT DOCUMENTS

DE 19519809 A1 * 12/1996

OTHER PUBLICATIONS

Polyscience, Model 7312 Immersion Circulator, http:www.polyscience.com/lab/7312.html, 2 pages, printed Jan. 6, 2010.
Polyscience, Model 7306 and 712 Immersion Circulators, http:www.polyscience.com/lab/7306.html, 2 pages, printed Jan. 6, 2010.
Cole-Parmer, Polystat Immersion Circulators, WU-12120-00, http://www.coleparmer.com/catalog/product_view.asp?sku=1212000&pfx= and http://static.coleparmer.com/large_images/12120_00_1.jpg, 3 pages, printed Jan. 6, 2010.
Cole-Parmer, Bath and Circulator Specifications Terminology, http://www.coleparmer.com/techinfo/print.asp? htmlfile=Bath_CircTerms.htm&ID=31, 2 pages, printed Jan. 6, 2010.

(Continued)

*Primary Examiner* — Charles Freay
*Assistant Examiner* — Aaron M Shakin
(74) *Attorney, Agent, or Firm* — Vedder Price P.C.

(57) ABSTRACT

An constant temperature circulator for maintaining a liquid at a constant temperature including a housing that encapsulates a controller, a display, a heating element, a temperature sensor, and an electric motor having an impeller. The housing includes a first port and a second port that cooperatively define a chamber that encapsulates the impeller, an aperture and an opening, such that actuation of the impeller when the electric motor is activated by the controller moves the liquid from the aperture, through the chamber and to the opening.

24 Claims, 6 Drawing Sheets

OTHER PUBLICATIONS

Thermo Scientific, Haake Immersion Circulators, WU-12206-40, http://www.coleparmer.com/catalog/product_view.asp?sku=1220640&pfx= and http://static.coleparmercom/large_images/12206_40.rtmo.jpg, 4 pages, printed Jan. 6, 2010.

Grant Optima Series K Clamp, Gu-Bo-Klamp, http://www.opticsplanet.net/grant-optima-series-immersion-circulators-boekel-scientific-klamp.html, 3 pages, printed Jan. 6, 2010.

Julabo, MC Heating Immersion Circulator Product Data Sheet and Operating Manual, http://www.julabo.de/en/p_print.asp?Produkt=MC and http://www.julabo.de/database/product_img/addimg2_mb-mc.jpg, 51 pages, printed Jan. 6, 2010.

Polyscience, shield, http://www.cuisinetechnology.com/images/shield.jpg, 1 page, printed Jan. 6, 2010.

* cited by examiner

CONSTANT TEMPERATURE CIRCULATOR

FIELD OF THE DISCLOSURE

The present disclosure is related to a constant temperature circulator, and more particularly, to an improved constant temperature circulator including, among other things, an integrally molded housing that encapsulates all associated components.

BACKGROUND

Current constant temperature circulators have many disadvantages, only some of which are described herein. Generally, conventional constant temperature circulators include a stainless-steel box enclosing various electrical components. Circulation and heating components depend unprotected from the box. One disadvantage of the box construction is that the box is made of multiple components and as a result tolerance stack up is a prevalent issue. In fact, significant efforts have been expended to reduce such tolerance issues, considerably raising the costs to manufacture. Another disadvantage is the lack of protection for the depending components (i.e., heating element, pump/circulation and temperature sensor) not only such that such components are not damaged, but also that the contents of any container into which the circulator is inserted are not damaged. Current attempts to address this disadvantage are multiple piece stainless steel components that face the same tolerance stack up issues mentioned herein. Accordingly, there is a need in the art for constant temperature circulators that overcome the disadvantages identified herein, among others, including, without limitation, reduces the cost of manufacture, achieves improved functionality with far fewer parts, improves reliability because of reduced tolerance stack up, prevents contact between the contents of a container into which the circulator is inserted and the moving or heating elements of the circulator, provide flow adjustment with respect to multiple outlets and a bidirectional pump for adjustable outlet flow and external circulation.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

DETAILED DESCRIPTION

The present invention is not limited to the particular details of the apparatus depicted, and other modifications and applications may be contemplated. Further changes may be made in the device without departing from the true spirit of the scope of the invention herein involved. It is intended, therefore, that the subject matter in this disclosure should be interpreted as illustrative, not in a limiting sense.

Figure 1:
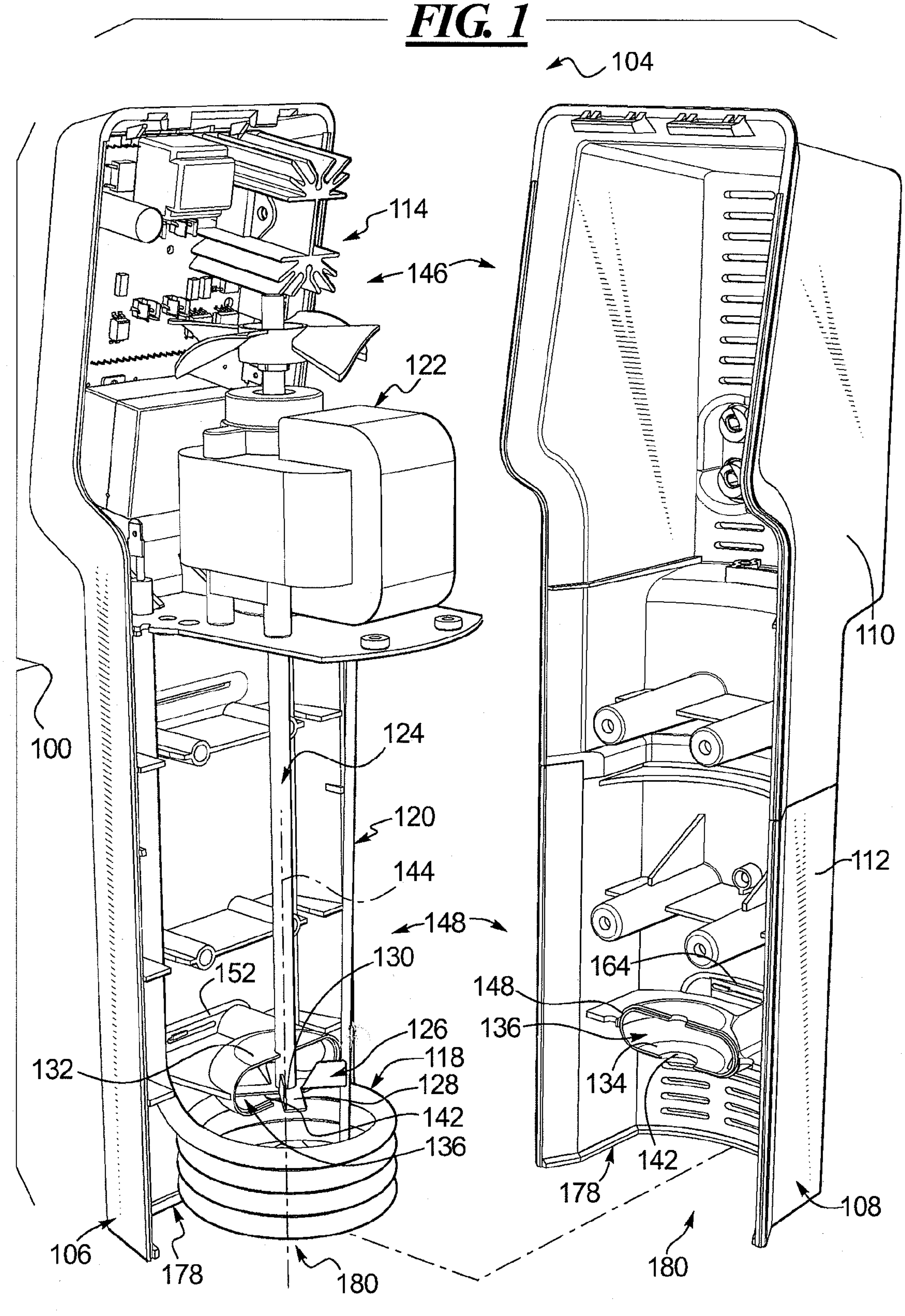
FIG. 1 is a partially exploded view of an constant temperature circulator in accordance with one embodiment of the present disclosure.
Figure 2:
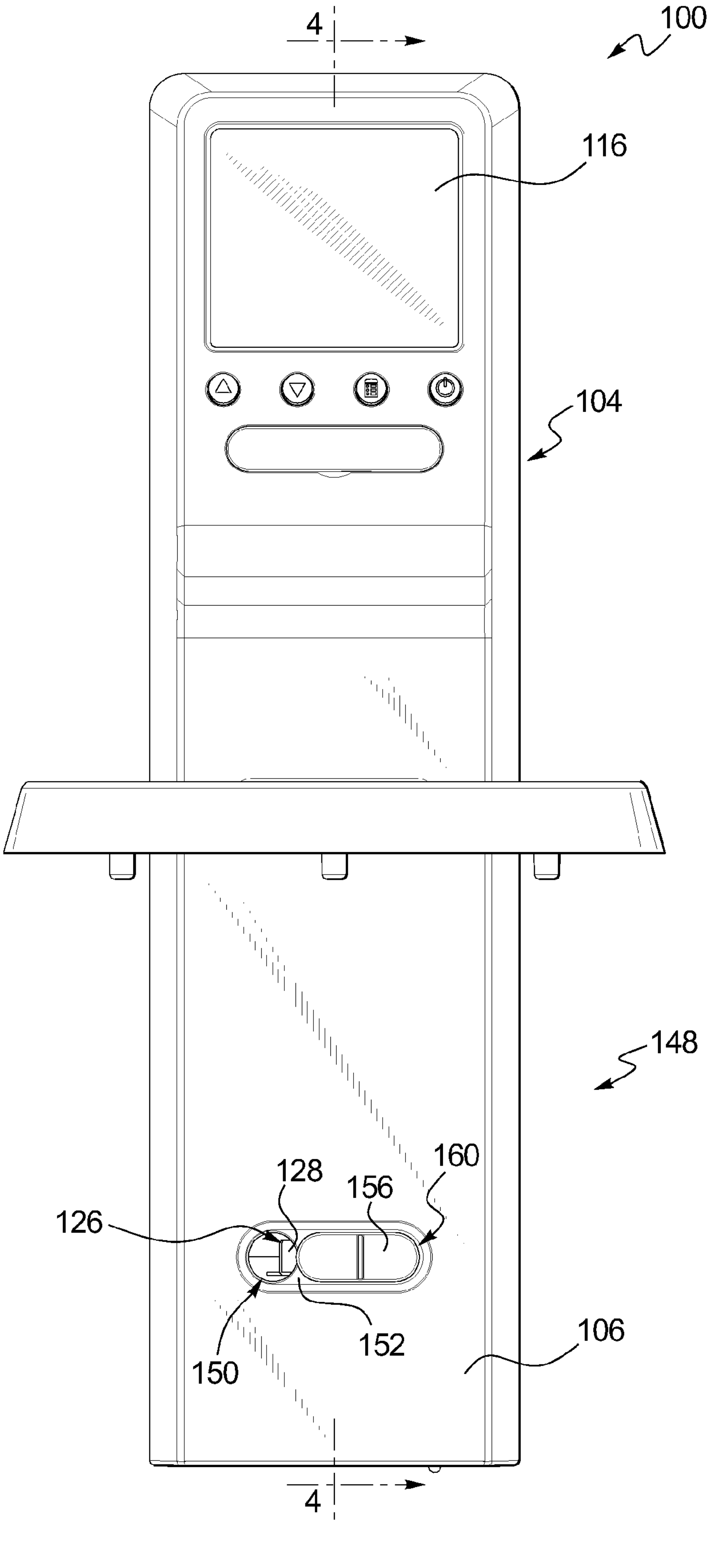
FIG. 2 is a front elevation view of one embodiment of the constant temperature circulator of FIG. 1.
Figure 4:
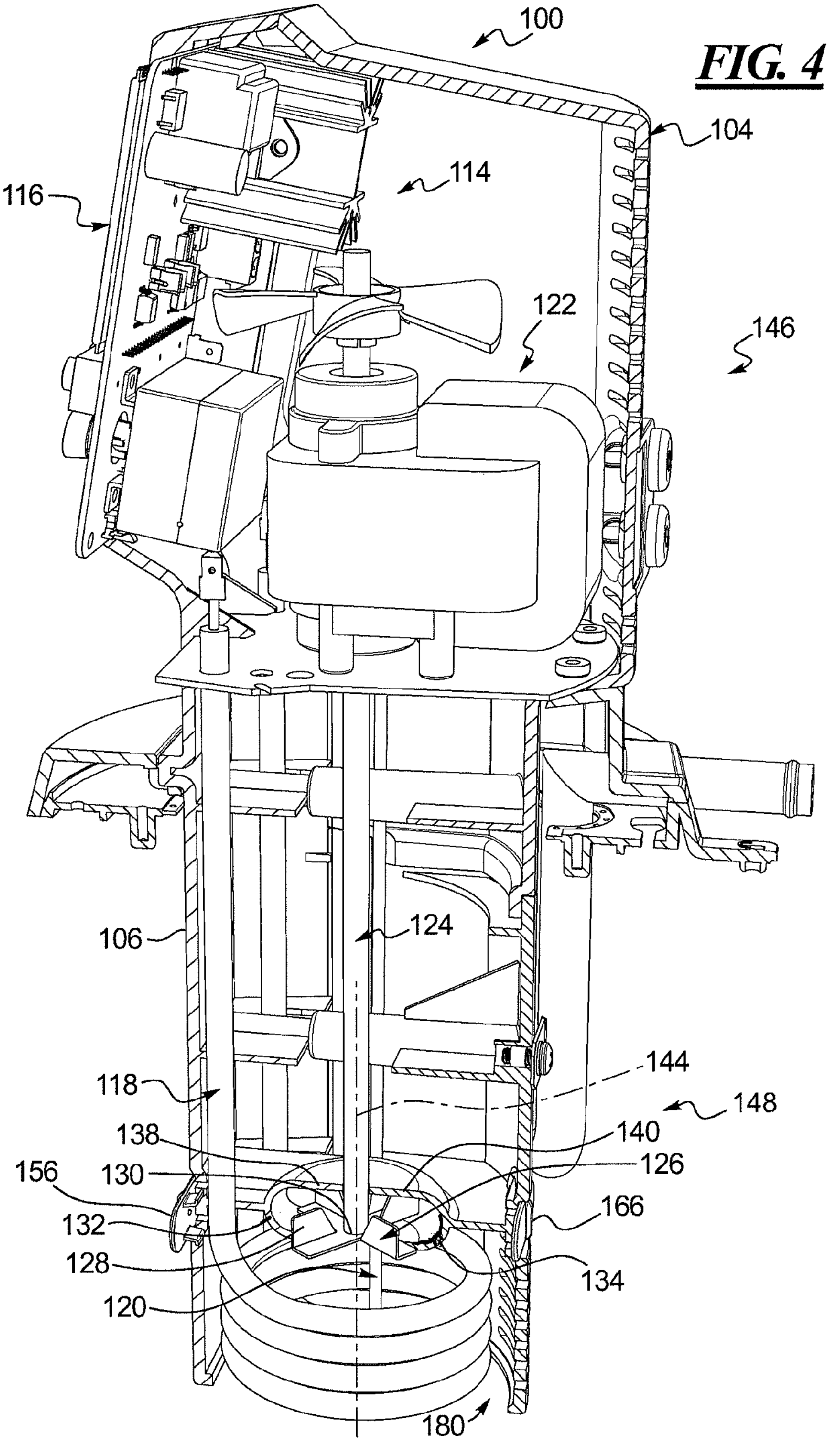
FIG. 4 is a cross-section view of the constant temperature circulator of FIG. 2 along line 4-4.

FIG. 1 is a partially exploded view of an constant temperature circulator 100 in accordance with one embodiment of the present disclosure and FIG. 4 is a cross-section view of the constant temperature circulator of FIG. 2 along line 4-4. One of ordinary skill in the art recognizes that an constant temperature circulator 100 is useful for maintaining a liquid (102, see FIGS. 5 and 6) at a constant temperature. In one embodiment, the constant temperature circulator 100 may include a housing 104 that encapsulates a controller 114, a display (116, see FIG. 2) connected to the controller 114, a heating element 118 connected to the controller 114, a temperature sensor 120 connected to the controller 114, and an electric motor 122 connected to the controller 114 including an output shaft 124 having an impeller 126. It is within the teachings of the present disclosure that the housing 104 may be formed in any suitable manner of any suitable material to perform the intended functionality. For example, the housing 104 may be formed by molding, milling, machining, casting, forging, or any other suitable manner of construction in one or more pieces. Preferably, the housing 104 is at least a two piece construction, where each piece is made by any suitable molding process that facilitates the tight control of tolerances. Most preferably, a first integrally injection molded cover 106 is connected to a second integrally injection molded cover 108, where the second integrally injection molded cover 108 may comprise a top portion 110 and a bottom portion 112 that may simplify manufacturing and assembly. Additionally, the housing 104 may be made from any suitable natural or synthetic material, such as metal, plastic, or composite. Preferably, the housing 104 is made from a synthetic polymer, such as Polysulfone or a temperature rated glass filled nylon, such as may be available from RTP Company as part number RTP 900 P-1720 Polysulfone or Dupont as part number Zytel HTNFR52G20NH PPA. In one embodiment, the housing 104 may further include an edge 178 disposed in the lower portion 148 to define a skirt cavity 180 below the chamber 136 to prevent objects that may be disposed in the liquid 102 from contacting the impeller 126, heating element 118 or output shaft 124.

In one embodiment, the controller 114, the display (116, see FIG. 2), the heating element 118, the temperature sensor 120, and the electric motor 122 may be preferably configured as conventional elements with conventional functionality. For example, the controller 114 may be a device controller, digital controller, analog controller, chip, card, programmable logic controller, microcontroller, proportional-integral-derivative controller or any other suitable device that is used for automation of an electromechanical processes or to facilitate extensive input/output (I/O) communication with the display (116, see FIG. 2), the heating element 118, the temperature sensor 120, and the electric motor 122. Preferably, the controller 114 includes a processor that may be, but not limited to, a single processor, plurality of processors, a DSP, a microprocessor, ASIC, state machine, or any other implementation capable of processing and executing software. The term processor should not be construed to refer exclusively to hardware capable of executing software, and may implicitly include DSP hardware, ROM for storing software, RAM, and any other volatile or non-volatile storage medium. Further, the controller 114 preferably includes memory that may be, but not limited to, a single memory, a plurality of memory locations, shared memory, CD, DVD, ROM, RAM, EEPROM, optical storage, microcode or any other non-volatile storage capable of storing digital data for use by the processor. In one embodiment, the controller 114 may be a Microchip PIC single chip microcontroller that includes onboard RAM and ROM, receives an input from a PT1000 resistance temperature detector and from user interface keys and provides output to drive triacs for the electric motor and the impeller, the heater and the liquid crystal display. Preferably, the controller 114 may include a set or sets of instructions to perform all of the following functions as described herein. It is within the teachings of the present disclosure that the instructions may be set forth in any suitable language or form in order to perform the intended functionality. Accordingly, for the sake of brevity this disclosure will not describe the exact instructions, but will rather describe the intended functionality of various aspects of the controller 114 below. Likewise, the display (116, see FIG. 2), the heating element 118, the temperature sensor 120, and the electric motor 122 may be any suitable version of such device that performs the intended functionality as is commonly understood with respect to such devices. For example, the display (116, see FIG. 2) may be an LCD, LED, OLED, or a custom made "chip on glass" LED back lighted LCD manufactured by Liquid Crystal Technologies as part number LCT0065, backlight part no. LCT0070, the heating element 118 may be a Calrod, tubular type heater, or in one embodiment, an 1100 watt element housed in an Incoloy 800 sheath manufactured by Zoppas Industries, distributed as PolyScience part no. 215-691 (120 v), 215-692 (240 v), the temperature sensor 120 may be a platinum RTD (Resistive Temperature Device) or thermistor, thermocouple, silicon temperature sensor, or in one embodiment, a 1000 ohm platinum RTD manufactured by Tempco Electric, distributed as PolyScience part number 200-496, and the electric motor 122 may be an open or closed frame or shaded pole, or in one embodiment, an open frame shaded pole motor by March Manufacturing, distributed as PolyScience part no. 215-696 (120 v), 215-697 (240 v). It is further within the teachings of the present disclosure that any other suitable device that performs the similar functionality may be freely substituted therefore. In one embodiment, the impeller 126 may be configured to be operated by the electric motor 122, when commanded by the controller 114, in a clockwise or a counter-clockwise direction.

In one embodiment, an upper portion 146 may be defined in the housing 104 that contains the controller 114, display 116 and electric motor 122. It is within the teachings of the present disclosure that the upper portion 146 is generally that portion of the constant temperature circulator 100 that is not immersed into the liquid 102. Accordingly, the extent of the upper and lower portions 146, 148 may be different in certain situations subject to the teachings herein. In one embodiment, a lower portion 148 is defined in the housing 104 that is adapted and configured to be immersed into the liquid 102 (see, FIGS. 5 and 6).

It is within the teachings of the present disclosure that the impeller 126 may have any suitable configuration in order to perform the intended functionality as described herein. For example, in one embodiment, the impeller 126 may have a four bladed configuration, where the blades 128 are commonly connected to a center portion that is connected to a distal end 130 of the output shaft 124. Other suitable configurations, including multiple impellers, curved blades and other alternative embodiments may be freely substituted therefore.

In one embodiment, the housing 104 may include a first port 132 and a second port 134 that cooperatively define a chamber 136 that encapsulates, encompasses or otherwise generally complementarily encloses the impeller 126 (see also FIG. 4) such that the impeller 126 may function as commonly understood in a pump to move a fluid from an inlet to an outlet. In one embodiment, the first and second ports 132, 134 may respectively include a first rim 138 and a second rim 140. As shown in FIG. 4, the chamber 136 may be cooperatively defined by the first port 132 and the second port 134 and configured to complementarily encapsulate the impeller 126 when the first rim 138 abuts the second rim 140. Additionally, an aperture 142 may be cooperatively defined by the first rim 138 and the second rim 140 that is in communication with the chamber 136. It is within the teachings of the present disclosure that the aperture 142 may have any suitable configuration or location. Preferably, the aperture 142 is symmetrically formed in the first and second rims 138, 140 in a top portion of the respective first and second ports 132, 134 and disposed about a longitudinal axis 144 of the output shaft 124, such that actuation of the impeller 126 when the electric motor 122 is activated by the controller 114 moves the liquid 102 from the aperture 142, through the chamber 136 and to an outlet as described herein.

Figure 3:
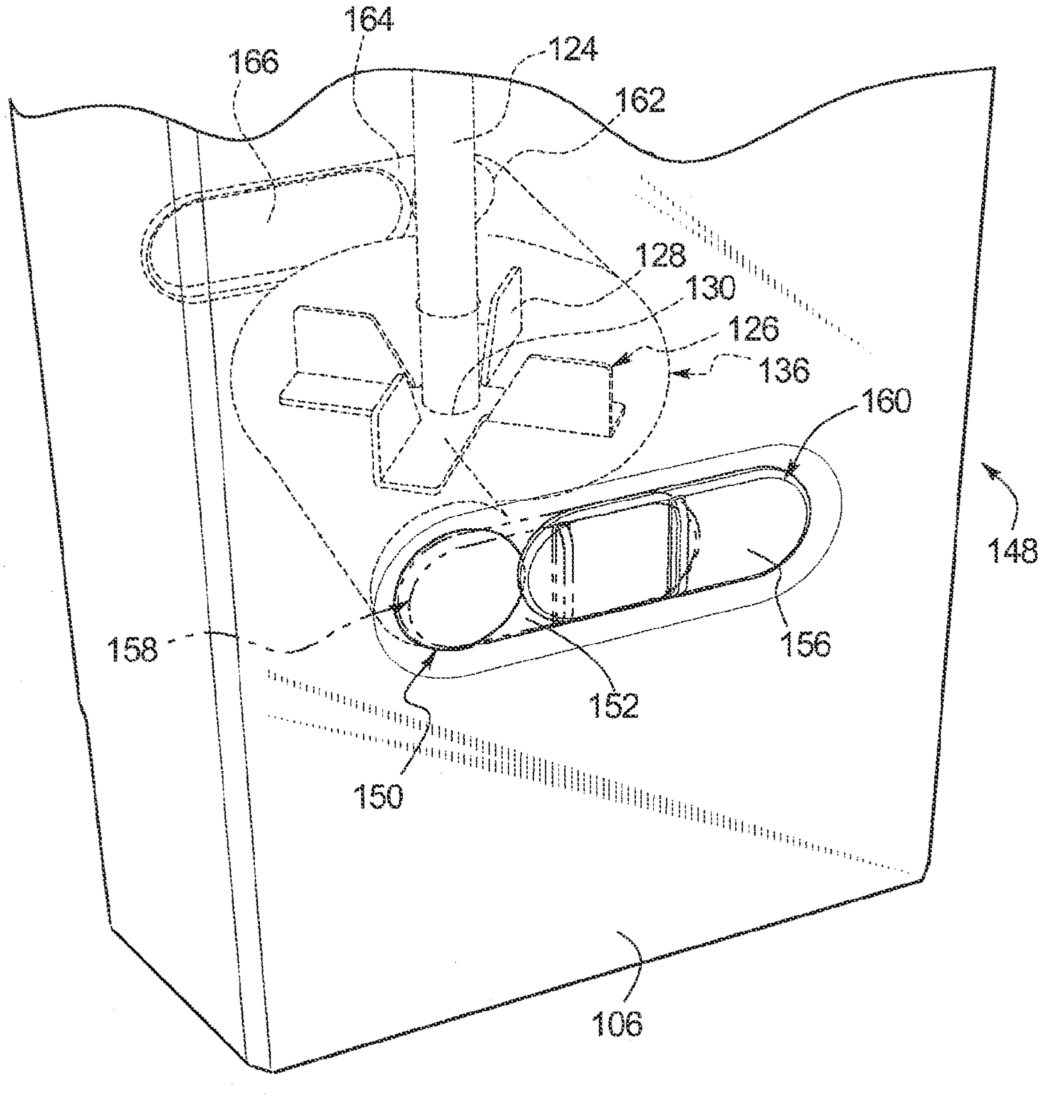
FIG. 3 is detailed view of a highlighted portion of constant temperature circulator of FIG. 2.

FIG. 2 is a front elevation view of one embodiment of the constant temperature circulator 100 of FIG. 1 and FIG. 3 is detailed view of a highlighted portion of constant temperature circulator of FIG. 2. In one embodiment, one of the first and second integrally molded covers 106, 108 includes a first opening 150 (shown on the first integrally molded cover 106 solely for example and not by way of limitation). It is within the teachings of the present disclosure that the first opening 150 may have any suitable configuration to perform the intended functionality. For example, the first opening 150 may be configured as generally symmetrical. The first opening 150 may be connected to and in communication with the first port 132 to define a distal outer extent of the first port 132. Preferably, the first opening 150 is disposed in the lower portion 148. In one embodiment, a first channel 152 may formed in the exterior surface of the housing 104 that is disposed within the lower portion 148. It is within the teachings of the present disclosure that the first channel 152 may have any suitable configuration to perform the intended functionality. For example, the first channel 152 may be configured as a recessed portion in the exterior surface of the housing 104 wherein a portion of the first channel 152 may surround the first opening 150 or may be operatively associated with the first opening 150. In one embodiment, a first adjuster 156 may be movably connected to the first channel 150 between a substantially closed position 158 restricting the first opening 150 and a substantially open position 160 unrestricting the first opening 150 to adjust a flow of the liquid 102 through the aperture 142 and the chamber 136. It is within the teachings of the present disclosure that the first adjuster 156 may be connected to the first channel 150 in any suitable manner to perform the intended functionality. For example, the first adjuster 156 may be snap-fit, slidingly engage, or any other suitable movable connection.

Figure 5:
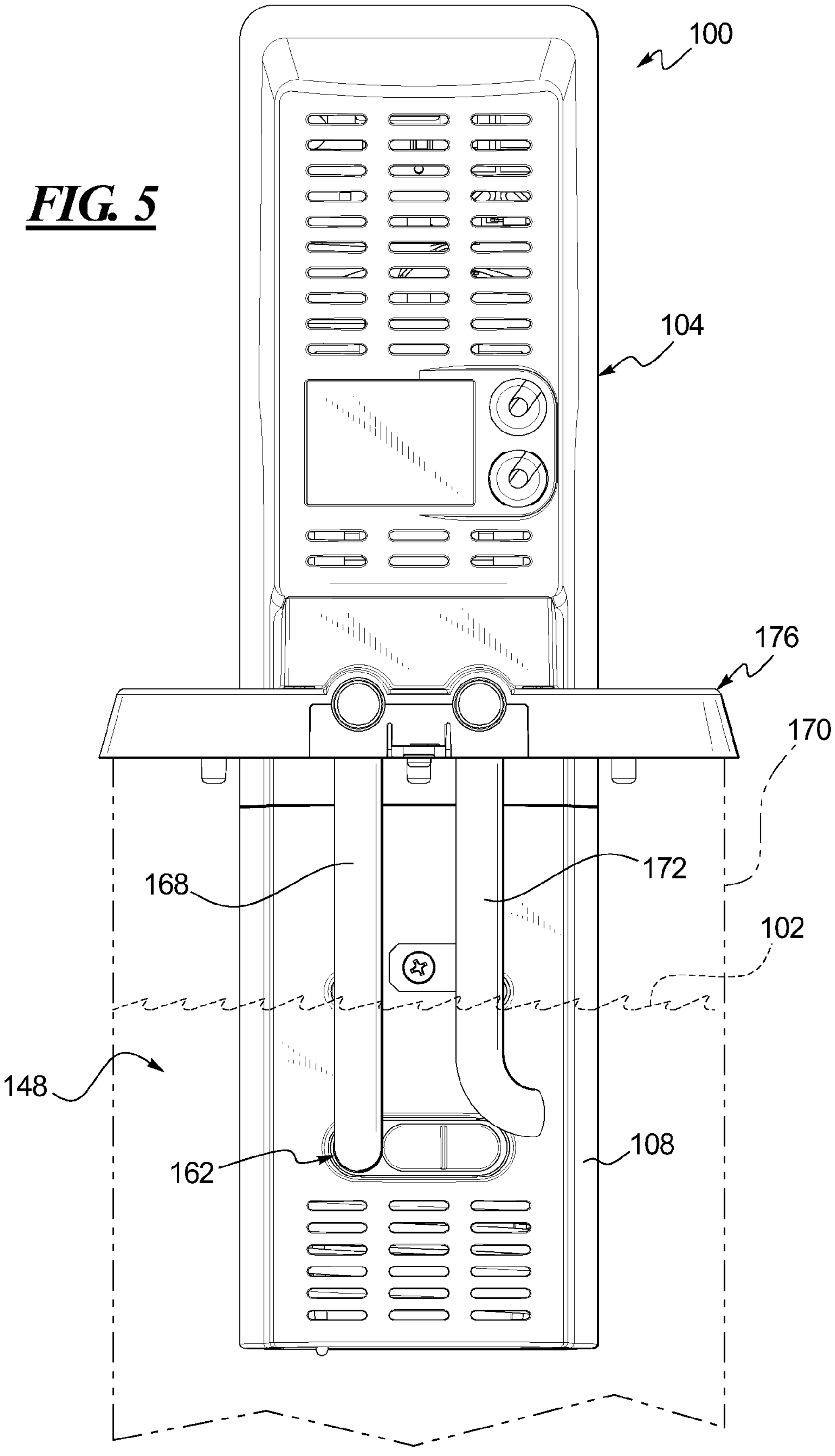
FIG. 5 is a rear elevation view of the constant temperature circulator of FIG. 2.

In one embodiment, an other of the first and second integrally molded covers 106, 108 includes a second opening 162 (shown in FIGS. 3 and 5 on the second integrally molded cover 108 solely for example and not by way of limitation). It is within the teachings of the present disclosure that the second opening 162 may have any suitable configuration to perform the intended functionality. For example, the second opening 162 may be configured as generally symmetrical. The second opening 162 may be connected to and in communication with the second port 134 to define a distal outer extent of the second port 134. Preferably, the second opening 162 is disposed in the lower portion 148. In one embodiment, a second channel 164 may formed in the exterior surface of the housing 104 that is disposed within the lower portion 148. It is within the teachings of the present disclosure that the second channel 164 may have any suitable configuration to perform the intended functionality. For example, the second channel 164 may be configured as a recessed portion in the exterior surface of the housing 104 wherein a portion of the second channel 164 may surround the second opening 162 or may be operatively associated with the second opening 162. In one embodiment, a second adjuster 166 may be movably connected to the second channel 162 between a substantially closed position 158 restricting the second opening 162 and a substantially open position 160 unrestricting the second opening 162 to adjust a flow of the liquid 102 through the aperture 142 and the chamber 136. It is within the teachings of the present disclosure that the second adjuster 166 may be connected to the second channel 162 in any suitable manner to perform the intended functionality. For example, the second adjuster 166 may be snap-fit, slidingly engage, or any other suitable movable connection.

Figure 6:
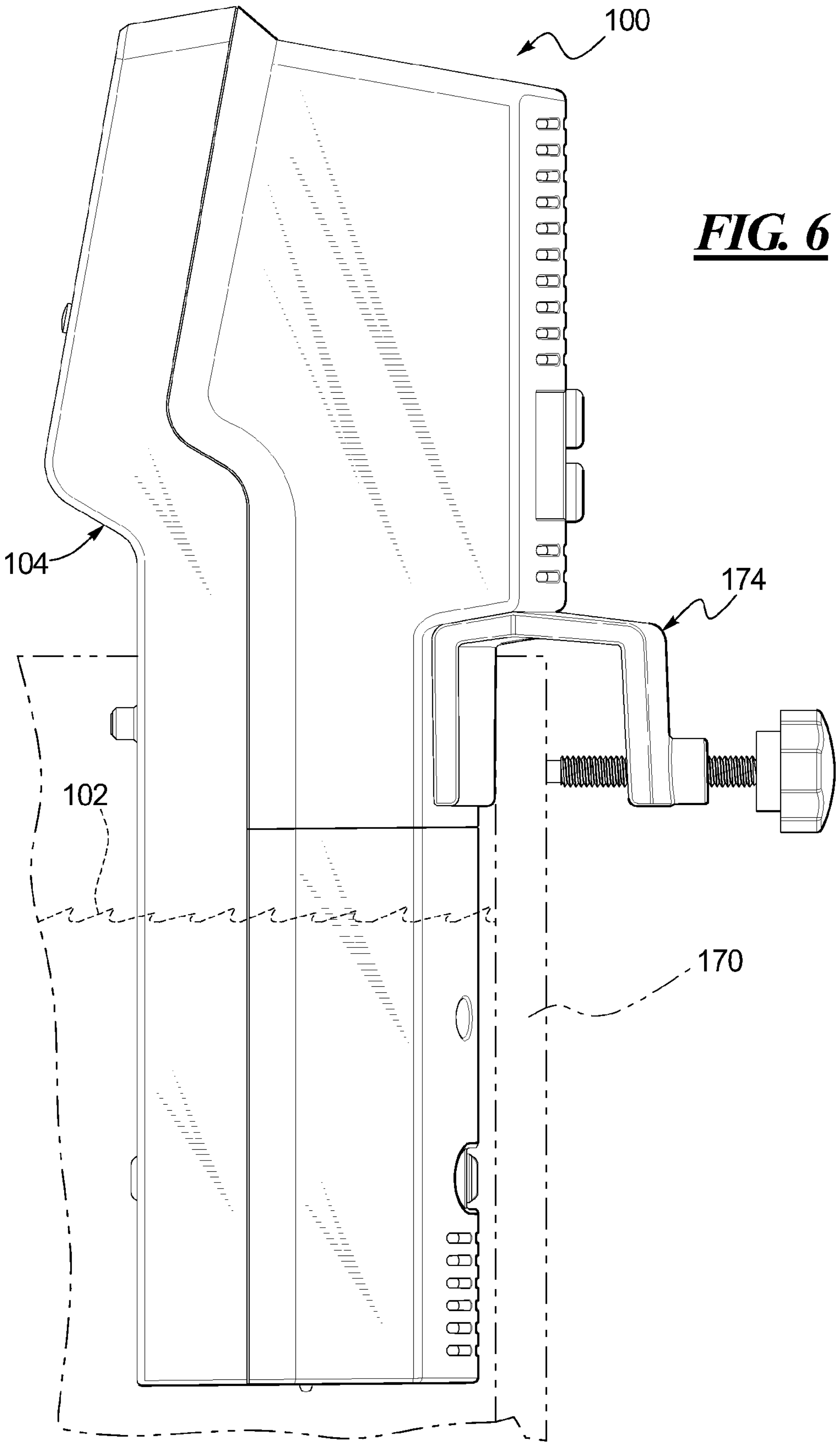
FIG. 6 is a side elevation view of one embodiment of the constant temperature circulator of FIG. 1.

FIG. 5 is a rear elevation view of the constant temperature circulator of FIG. 2 that is a front elevation view of one embodiment of the constant temperature circulator 100 of FIG. 1 and FIG. 6 is a side elevation view of one embodiment of the constant temperature circulator of FIG. 1. In one embodiment, an outlet tube 168 may be connected to one of the first and second openings 150, 162 in order to facilitate connection to an external device to perform conditioning of the liquid 102, such as adjusting a temperature of the liquid 102, external to or remote from a container 170 for the liquid 102. It is within the teachings of the present disclosure that the one of the first and second openings 150, 162 or both may be configured in any suitable manner to accept, receive, engage or otherwise facilitate direct connection of the outlet tube 168 or by way of a connector, coupling or other intermediate device. In operation, an other of the first and second openings 150, 162 is disposed in the closed position 158 so that liquid 102 drawn into the chamber 136 through the aperture 142 is discharged out the one of the first and second openings 150, 162 and the outlet tube 168. An inlet tube 172 may be provided to facilitate return of the liquid 102 to the container 170.

In one embodiment, the housing 104 may include a mounting element removably connected to the housing 104 so that the housing 104 may be removably connected to the container 170 for the liquid 102. It is within the teachings of the present disclosure that the mounting element may have any suitable configuration to perform the intended functionality. For example, the mounting element may be configured as a clamp 174 (for engaging a rim of the container 170) or a base ring 176 (for covering an opening of the container 170). The clamp 174 and base ring 176 may be configured in any suitable manner to facilitate removable connection of the constant temperature circulator 100 to the container 170.

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

What is claimed is:

1. A constant temperature circulator for maintaining a liquid at a constant temperature including a controller, a display connected to the controller and an electric motor connected to the controller including an output shaft having an impeller, the constant temperature circulator comprising: a housing including a first integrally molded cover connected to a second integrally molded cover, an upper portion defined in the housing that contains the controller, display and electric motor and a lower portion defined in the housing adapted to be immersed into the liquid; one of the first and second integrally molded covers including a first inlet, a first casing extending from the first inlet to a first rim and a first channel disposed within the lower portion; an other of the first and second integrally molded covers including a second casing having a second rim disposed within the lower portion; a chamber cooperatively defined by the first casing and the second casing and configured to complementarily encapsulate the impeller when the first rim abuts the second rim; an outlet cooperatively defined by the first rim and the second rim in communication with the chamber; and a first adjuster movably connected to the first channel to adjust a flow of the liquid through the chamber, the movement of the first adjuster between a substantially closed position and a substantially open position.

2. The constant temperature circulator of claim 1, further comprising a second inlet formed in the lower portion and in communication with the second casing.

3. The constant temperature circulator of claim 1, wherein the first integrally molded cover and the second integrally molded cover are each molded from a synthetic polymer.

4. The constant temperature circulator of claim 2, further comprising a second channel and a second adjuster movably connected to the second channel and movable to adjust a flow of the liquid through the chamber between a substantially closed position and a substantially open position.

5. The constant temperature circulator of claim 1, wherein the housing further includes an edge disposed in the lower portion to define a skirt cavity below the chamber to prevent objects disposed in the liquid from contacting the impeller or output shaft.

6. The constant temperature circulator of claim 1, further comprising a mounting element removably connected to the housing so that the housing may be connected to a container for the liquid.

7. The constant temperature circulator of claim 6, wherein the mounting element is selected from the group consisting of a clamp and a base ring.

8. The constant temperature circulator of claim 2, further comprising a tube connected to the second inlet to facilitate connection to an external device for adjusting a temperature of the liquid.

9. The constant temperature circulator of claim 1, wherein the outlet is disposed about a longitudinal axis of the output shaft.

10. A constant temperature circulator for maintaining a liquid at a constant temperature comprising: a controller; a display connected to the controller; an electric motor connected to the controller including an output shaft having an impeller; a housing including a first integrally molded cover connected to a second integrally molded cover, an upper portion defined in the housing that contains the controller, display and electric motor and a lower portion defined in the housing adapted to be immersed into the liquid; one of the first and second integrally molded covers including a first inlet, a first casing extending from the first inlet to a first rim and a first channel disposed within the lower portion; an other of the first and second integrally molded covers including a second casing having a second rim disposed within the lower portion; a chamber cooperatively defined by the first casing and the second casing and configured to complementarily encapsulate the impeller when the first rim abuts the second rim; an outlet cooperatively defined by the first rim and the second rim in communication with the chamber; and a first adjuster movably connected to the first channel to adjust a flow of the liquid through the chamber between a substantially closed position and a substantially open position.

11. The constant temperature circulator of claim 10, further comprising a second inlet formed in the lower portion and in communication with the second casing.

12. The constant temperature circulator of claim 10, wherein the first integrally molded cover and the second integrally molded cover are each molded from a synthetic polymer.

13. The constant temperature circulator of claim 11, further comprising a second channel and a second adjuster movably connected to the second channel and movable to adjust a flow of the liquid through the chamber between a substantially closed position and a substantially open position.

14. The constant temperature circulator of claim 10, wherein the housing further includes an edge disposed in the lower portion to define a skirt cavity below the chamber to prevent objects disposed in the liquid from contacting the impeller or output shaft.

15. The constant temperature circulator of claim 10, further comprising a mounting element removably connected to the housing so that the housing may be connected to a container for the liquid.

16. The constant temperature circulator of claim 15, wherein the mounting element is selected from the group consisting of a clamp and a base ring.

17. The constant temperature circulator of claim 11, further comprising a tube connected to the second inlet to facilitate connection to an external device for adjusting a temperature of the liquid.

18. The constant temperature circulator of claim 10, wherein the impeller is configured to be operated by the electric motor in a clockwise direction and a counter-clockwise direction.

19. A constant temperature circulator for maintaining a liquid at a constant temperature comprising: a controller; a display connected to the controller; an electric motor connected to the controller including an output shaft having an impeller; a housing including a first integrally molded cover connected to a second integrally molded cover, an upper portion defined in the housing that contains the controller, display and electric motor and a lower portion defined in the housing adapted to be immersed into the liquid; one of the first and second integrally molded covers including an inlet, a first casing extending from the first inlet to a first rim and a first channel disposed within the lower portion; an other of the first and second integrally molded covers including a second casing having a second rim disposed within the lower portion; a chamber cooperatively defined by the first casing and the second casing and configured to complementarily encapsulate the impeller when the first rim abuts the second rim; an aperture cooperatively defined by the first rim and the second rim in communication with the chamber.

20. The constant temperature circulator of claim 19, further comprising a second inlet formed in the lower portion and in communication with the second casing.

21. The constant temperature circulator of claim 19, wherein the first integrally molded cover and the second integrally molded cover are each molded from a synthetic polymer.

22. The constant temperature circulator of claim 19, further comprising a mounting element removably connected to the housing so that the housing may be connected to a container for the liquid.

23. The constant temperature circulator of claim 22, wherein the mounting element is selected from the group consisting of a clamp and a base ring.

24. A circulator for maintaining a liquid at a constant temperature including: a controller; a display, a heating element, a temperature sensor, and a motor each connected to the controller; and a housing for holding the controller, the display, the heating element, the temperature sensor, and the motor, wherein the housing includes a first integrally molded cover with the display and a second integrally molded cover connected to the first integrally molded cover, and wherein the housing further defines an upper portion for holding the controller, the display and the motor and a lower portion adapted to be immersed into the liquid and holding the temperature sensor and the heating element, wherein the lower portion of the housing further includes at least a first opening on the first integrally molded cover for the passage of the liquid through the housing, and wherein the first opening is circular in shape, and wherein the lower portion of the housing further include a second opening on the second cover for the passage of the liquid through the housing, and wherein the second opening is circular in shape.

* * * * *